2,942,154

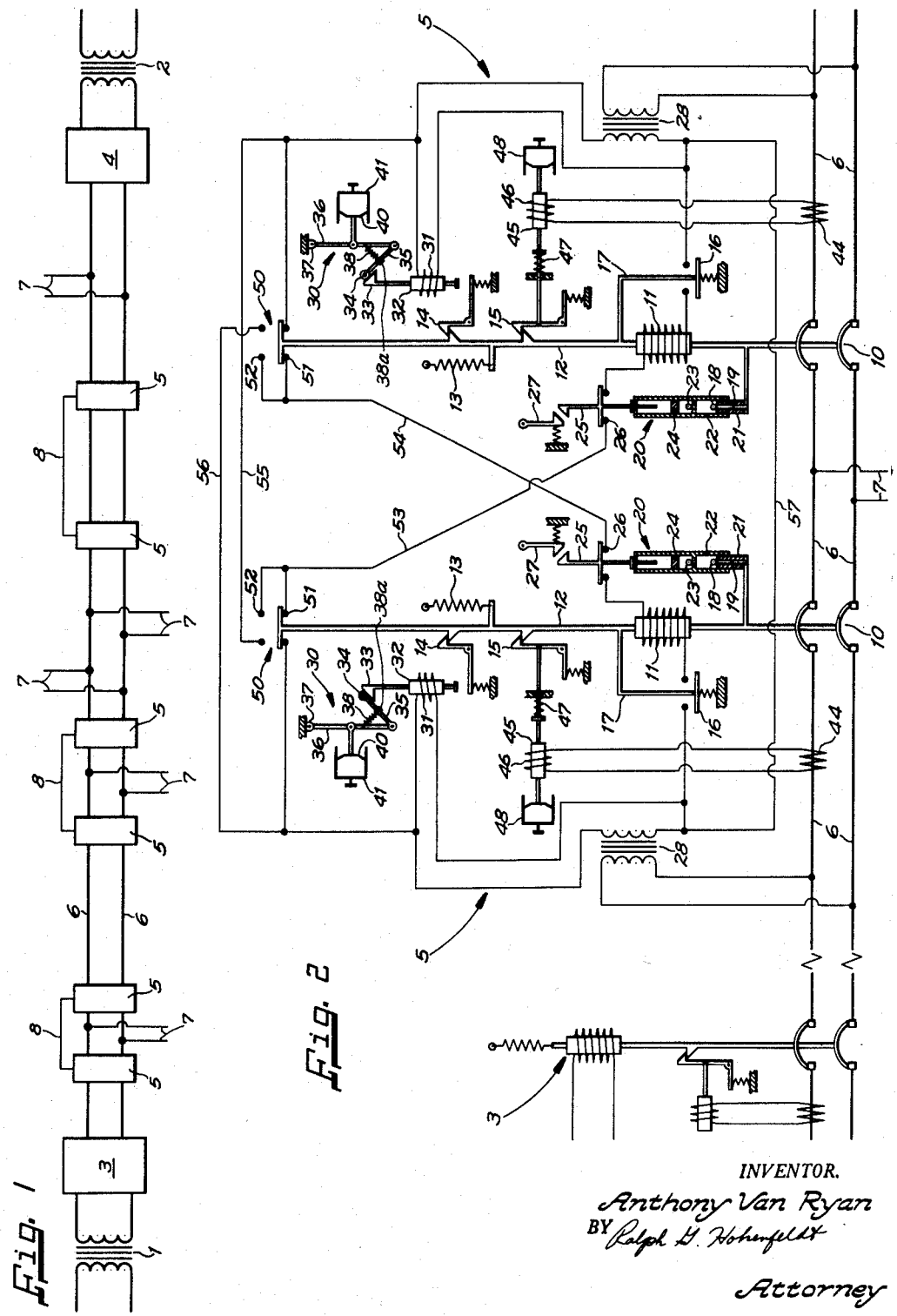

**SCHEME AND APPARATUS FOR SECTIONALIZ-
ING ELECTRICAL SYSTEMS**

Anthony Van Ryan, Ocean Springs, Miss., assignor to
McGraw-Edison Company, a corporation of Delaware Filed Oct. 29, 1956, Ser. No. 618,964

14 Claims. (Cl. 317—22)

This invention relates generally to means for isolating a faulted portion of an electrical system and rapidly restoring service to the unfaulted portion. The invention has particular, but not exclusive, application in interconnected systems where a faulted line may be supplied from multiple sources.

In order to assure continuity of electrical service, it has become common practice to supply main and branch lines from interconnected distantly spaced supply stations so that in the event of a fault appearing on the main lines, the faulty section may be isolated and the supply of power continued to the remaining unaffected portions of the main line from each of the alternative sources.

A variety of sectionalizing schemes are now in use. For example, air disconnect switches may be installed on each side of a branch line, and in the event of a permanent fault, the main line may be de-energized by a protective circuit breaker at the sources until a lineman reaches the scene and isolates the fault by opening the disconnect switches connected to the opposite ends of the faulted section. Obviously, the delay incident to such practice, accompanied by loss of revenue and goodwill, is intolerable where important loads are involved.

There are also a number of automatic schemes available for isolating faults but their use has not become widespread because they generally involve numerous expensive automatic circuit breakers which entail difficult problems of coordination and costly auxiliary equipment.

Despite the inconvenience of schemes employing sectionalizing switches and the high initial cost of schemes using circuit breakers for sectionalizing, their use has been justified in the interest of good customer relations and to mitigate the serious loss of revenue which accrues at an alarming rate during an outage.

It is known that permanent faults occur infrequently on high voltage lines, most faults being of a transient nature, such as those caused by lightning strokes, which can be cleared by the momentary opening of a protective circuit breaker. However, there are occasional permanent faults which must be isolated quickly and remain isolated until a crew can be dispatched to perform necessary repair work.

Accordingly, a general object of the present invention is to provide a novel scheme and apparatus for automatically isolating faulted sections in an electric power line.

Another object of this invention is to provide a scheme for protecting a power line through using a plurality of simple, inexpensive, sectionalizing devices having a novel mode of operation.

A further object of the invention is the provision of an automatic sectionalizing apparatus which operates to lock-out when connected to a faulted line section and also permits rapid restoration of power to the remaining unfaulted sections and to the branch lines connected thereto.

Additional objects will appear periodically throughout the course of the ensuing specification.

In general terms, the present invention constitutes a scheme and apparatus primarily intended for isolating faulted sections of a power line energized from multiple sources and provided with a plurality of taps or branch lines distributed along the main line. Each sectionalizer includes a main line switch which serially connects adjacent main line sections. When a line section becomes faulted, the apparatus automatically disconnects that line section from its sources and allows continued feeding of the branch lines from the individual sources through the unfaulted line sections. Thus by locating a sectionalizer at opposite ends of the main line sections or on opposite sides of a branch line, faulted sections of the main line may be isolated from both sources without losing service to the branch line.

It is proposed that a reclosing circuit breaker be provided near each of the sources for de-energizing the system before the sectionalizers open following occurrence of a fault. This places interrupting duty on the breakers and removes it from the sectionalizers. Moreover, it is contemplated that the circuit breaker may be adjusted for rapid reclosure, following its first opening, and time delayed reclosure after subsequent openings, since most faults are temporary and will be cleared on the first opening operation. It is therefore within the purview of the invention to also block or time delay tripping of the sectionalizers until after the first circuit breaker operation has been executed so that the sectionalizers will not function unnecessarily on temporary faults.

The sectionalizers and circuit breakers may be individually provided with counting means for integrating their operations and for actuating lockout means after any selected number of operations.

An illustrative embodiment of the invention is characterized by a sectionalizing switch which has its own time delayed voltage controlled latch and a current controlled latch. If a fault occurs in any line section, the source circuit breakers open due to the action of their overcurrent relays. The opening of these circuit breakers is followed by the opening of the sectionalizers because of the release of their voltage and current latches. When the source breakers reclose, the sectionalizers reclose sequentially, but only those which have normal load voltage on their voltage sensitive latches will be temporarily restrained from opening. As each one of the two sectionalizers finally closing in on the opposite ends of the faulted section will not be energized by normal load voltage, but by a voltage appreciably less in value, their voltage latches will not act to temporarily restrain these sectionalizers from opening. The fault thus being re-established, will again be cleared by the opening of the source circuit breakers. Following this second opening, only the two sectionalizers nearest the fault will now release their voltage latches in addition to their current latches and cause the opening of these sectionalizers. If so desired, the source breakers may reclose and reopen a number of times until such a time that the sectionalizers nearest the fault lock open to be followed by the final reclosing of the source circuit breakers.

Counting and lockout mechanism are provided in each sectionalizer for totalling the number of operations. Because only the sectionalizers nearest the faulted section operate repeatedly, only these sectionalizers will finally lock out and allow all preceding sectionalizers in the direction of each source to remain closed for supplying the main and branch lines now being fed from the isolated sources. Subsequently, the time delay of the voltage latches will expire and these latches will be free to trip their associated sectionalizers whenever a fault occurs which opens the back-up circuit breaker.

A more detailed description of one embodiment of the invention will now be set forth in connection with the following drawing in which:

Fig. 1 is a schematic representation of a plural source electrical system embodying the novel sectionalizer; and Fig. 2 depicts a pair of typical sectionalizers adapted to practice the scheme, the elements of each sectionalizer being in normal operating position and supplying a branch line circuit from a main line.

Fig. 1 illustrates a simplified electrical system having separate sources 1 and 2 symbolized by transformers although it is to be understood that the sources may consist in generating stations or merely other feeder lines being connected together by the system represented. Each of the sources is connected to the system through back-up protective circuit breakers 3 and 4 which are preferably of the conventional self-reclosing type adapted to trip on fault current and lock out following a series of closely successive opening and reclosing operations. The system also includes the novel sectionalizers 5 adapted to connect adjacent line sections 6 in series. Also included are a plurality of branch lines 7 connected to the main lines under various conditions. For example, under certain conditions the branch line is connected between a pair of closely adjacent sectionalizers 5 and in other instances there are a number of branch lines between distantly spaced sectionalizers 5, and in another case there are no branch lines between the sectionalizers.

Although all of the sectionalizers 5 in the system cooperate with each other in one respect, certain of them are connected in pairs by a control cable 8 including conductors whose purpose will be described in detail hereinafter. It will be understood that any number of sectionalizer units 5 may be serially connected and that they may protect many miles of power lines.

Details of a representative form of sectionalizer unit 5 for practicing the invention will be described in connection with Fig. 2 which schematically shows a pair of sectionalizers 5 joining together adjacent line sections 6 under normal operating conditions. The sectionalizers 5 may be remotely spaced from each other as suggested by Fig. 1, but they are here shown on immediately opposite sides of a branch line 7. Under certain circumstances the sectionalizers may isolate adjacent line sections 6 from each other and under others they may merely isolate the branch lines 7 from one of the alternative sources 1 or 2 while continuing to feed from the other source.

Sectionalizers 5 include a line switch 10 for affecting separation of the line sections 6. Line switch 10 may be operated by any suitable electrical, pneumatic or hydraulic means. In this illustrative example, line switch 10 is closed by electromagnetic means comprising solenoid coil 11 adapted to pull a line switch carrier bar 12 downwardly when the solenoid 11 is energized. Opening of the line switch 10 is accomplished by energy stored in an opening spring 13 which tends to bias the line switch upwardly with a snap action when unlatched. Opening spring 13 is maintained in an extended condition by engagement of carrier bar 12 by a schematically represented voltage controlled latch 14 and also, under certain circumstances, a current controlled latch 15. The latches 14 and 15 are adapted to hold line switch 10 closed under normal operating conditions and to release the line switch under circumstances associated with the occurrence of a fault on the line sections 6.

In order to de-energize the electromagnetic switch closing means 11 immediately after line switch 10 is fully closed, each solenoid circuit is provided with a limit contact 16 which may be opened by an L-shaped operating arm 17 when line switch 10 completes its closing stroke.

The sectionalizer unit 5 also includes means for locking the line switch 10 open after it has opened and closed successively during prevalence of a fault condition in the system. It will appear hereinafter that only the line switch 10 attempting to connect a source to a faulted line section 6 will lock out. The exemplary lockout mechanism, designated generally by the reference numeral 20, is of the cumulative hydraulic type although it may take any suitable form. The lockout means include a pump piston 21 actuated by an arm extending laterally from carrier bar 12. Piston 21 reciprocates in a stationary cylinder 22 in correspondence with vertical movements of the line switch 10. Cylinder 22 has a ball check valve 23 which on each stroke of piston 21 admits a predetermined quantity of hydraulic fluid under a lockout piston 24 slidably disposed within the cylinder. Another ball check 18 admits fluid into cylinder 22 through a hole 19 on the downward or intake stroke of pump piston 21. Ball 18 seals with hole 19 during the compression or counting stroke of piston 21. After a number of closely successive strokes by piston 21, lockout piston 24 advances in a step-by-step manner until it strikes a latch stem 25 which permanently opens lockout switch 26, and accordingly, the circuit closing electromagnetic solenoid 11. Lockout stem 25 has a hooked end which engages a spring-biased pawl 27 whenever stem 25 is fully elevated. The stem is restrained in upward position until released manually. During the lockout period, lockout piston 24 is free to re-settle to its lowermost position within cylinder 22 so that if latch stem 25 is manually released from pawl 27, the lockout contacts 26 will immediately reclose and prepare the sectionalizer for another series of opening and reclosing operations.

It was mentioned earlier that each line switch 10 is held closed by the engagement of a voltage controlled latch 14 whenever the switch 10 closes. When normal voltage appears on the line section 6 adjacent each side of the line switch 10, it is desirable that latch 14 maintain its engagement. Conversely, when switch 10 closes to connect a faulted line section 6 to the source, it is desired that latch 14 be releasable for permitting opening of switch 10 as soon as current flow stops as a consequence of the automatic opening of the protective circuit breaker 3. Since different voltages appear on the section 6 when faulted and unfaulted, control of latch 14 is accomplished through a voltage sensitive relay designated generally by the reference numeral 30. Voltage relay 30 comprises a solenoid coil 31 energized by voltage on a line section 6 on the source side of a switch 10 through a step-down control transformer 28. Voltage coil 31 has a plunger 32 which normally floats in a position shown in Fig. 2 under the influence of the magnetic field created by coil 31. If the voltage disappears from coil 31, plunger 32 drops to a position where it strikes and releases voltage latch 14. This alone will not permit line switch 10 to open since it is still held in closed position by another current latch 15, the details and purpose of which will be described shortly hereinafter.

Although magnetic plunger 32 is free to float as illustrated in Fig. 2, when solenoid coil 31 is subjected to normal load voltage conditions, the plunger may also be restrained and delayed in an upward position by engagement of a hook-like latch 33 carried by the plunger. For example, when coil 31 is initially energized with normal load voltage it will attract plunger 32 from its lowermost position to an overtravel position where latch 33 rides past and over a detent roller 34 which holds the latch in its overtravel position until released following a time delay period. Plunger 32 will rise to a position where it may be restrained by detent roller 34 only when normal load voltage appears on solenoid coils 31. When the coil 31 is energized by subnormal voltage, plunger 32 will be attracted upwardly but not sufficiently to be engaged and restrained by detent 34. Under this condition plunger 32 assumes a position with respect to latch 14 where it floats under magnetic influence a distance somewhat less from the latch than shown in Fig. 2, its position depending upon the available voltage. Whether or not normal load voltage conditions continue to prevail, it is desired that latch 33 be released after a time delay period so that plunger 32 may return to a floating or latch trip position.

The exemplary means for restraining plunger 32 upwardly and ultimately releasing the same after a time delay includes the detent roller 34 carried at the end of a lever 35 which is pivotally joined to a lever 36. Lever 36 is carried on an anchor pivot 37 and the levers 36 and 35 are interconnected by a capped pin 38a which is fixed in lever 36 and slidable through lever 35 for limiting angular movement between these levers. A compression spring 38 surrounds pin 38a. Attached to lever 36 is a time delay piston 40 extending into a dashpot 41. Time delay piston 40 is adapted to resist movement toward the closed end of dashpot 41 and to move freely away from the closed end.

From the description thus far, it will be evident that latch 33 is free to pass over and be engaged by roller 34 when plunger 32 is attracted to its uppermost position. This is possible by reason of roller arm 35 pivoting with respect to link 36 while compressing spring 38, but link 36 does not swing because it is restrained by time delay piston 40. When the momentum of plunger 32 is dissipated, latch 33 will bear on roller 34 and create a moment arm about the pivot point 37. This moment arm has a tendency to rotate link 36 clockwise and urge time delay piston 40 toward the closed end of dashpot cylinder 41. During the period in which latch 33 is restrained, time delay piston 40 continues to yield and ultimately roller 34 swings free of latch 33. Upon this event plunger 32 is free to drop down to the floating position in accord with the available voltage as represented in Fig. 2, and time delay piston 40 allows quick and unrestrained return of links 35 and 36 to their position shown in Fig. 2 under the influence of gravity.

No special significance is here given to the actual construction of the voltage relay or the time delay and release device since for the purposes of the present invention any equivalent means are satisfactory which temporarily delay a voltage sensitive trip means from being restored to normal position after normal load voltage is applied and, furthermore, prevents both latching and time delay if subnormal voltage is applied.

Line switch 10 is also provided with a latch 15 controlled in response to current conditions and adapted to be released when substantially no current is flowing in the main line section 6. Current latch 15 is pressed toward engagement with carrier bar 12, whenever current is flowing in the main line section 6, by means of a solenoid plunger 45 which is surrounded by a current coil 46 supplied from a current transformer 44. Transformer 44 may be dispensed with if solenoid coil 46 is connected directly in series with a line section 6 on the source side of the line switch 10. A time delay assembly 48 may also be attached to the current latch 15 in order to permit coordination of its release time with the timing of the circuit breakers and to allow retardation of the latch 15 so that it will not release when current drops temporarily. Then too, if the time delay is such that it is effective only on the first opening operation of the circuit breakers, all of the current latches 15 will hold their line switches 10 closed during that time so that if the fault is cleared on the first circuit breaker opening, power will be restored to the entire system without delay necessary to reclose the sectionalizers in sequence.

The construction of the current latch assembly is such that when current controlled coil 46 is energized, corresponding with the flow of a predetermined line current, plunger 45 presses latch 15 into engagement with carrier bar 12. When coil 46 is de-energized, latch 15 is released from engagement with carrier bar 12 through the agency of a compression spring 47. The important attribute of the current latch 15 is that it prevents line switch 10 from opening while any appreciable current is flowing in the line sections 6 controlled by that particular sectionalizer. Since the line switches need not open during flow of fault or load current they may be designed for lighter duty. The severest duty placed on the line switches 10 as the invention is here constituted will be that of closing-in occasionally on a faulted circuit.

Since the sectionalizers 5 are arranged to be sequentially closed after a fault in response to the appearance of normal voltage on each successive line section 6 in the direction away from a source, it is necessary, in protecting a multiple source system, that pairs of adjacent sectionalizers 5 be interconnected by means such as a control cable 8 suggested in Fig. 1 so that each succeeding sectionalizer will have its closing coil 11 energized with normal voltage. Considering a pair of sectionalizers 5, during their closing sequence, normal load voltage will appear on the source side of one sectionalizer so that full power will be available to its closing solenoid 11 for operating its line switch 10 to closed position. Closing of the various sectionalizers in the system is thus initiated with those sectionalizers nearest each source and continued until all line sections 6 are serially connected and the sources are interconnected. Consequently, energization of the closing mechanism for a sectionalizer 5 nearest a source is controlled through the next adjacent sectionalizer interconnected with the first by means of a control cable 8.

For this purpose each sectionalizer 5 includes a selector switch designated generally by the reference numeral 50. Selector switch 50 may take one of two positions dependent upon the position of line switch 10 which in the illustration controls the selector switch through the medium of carrier bar 12. When line switch 10 is closed, lower contacts 51 of the selector are closed, and when line switch 10 is open the upper contacts 52 of the selector switch are closed. The selector switch 50 associated directly with a particular sectionalizer 5 controls the energization and de-energization of the closing solenoid associated with the next adjacent sectionalizer reckoned in either direction. The control wires interconnecting pairs of adjacent sectionalizers are designated by the reference numerals 53 through 57 in Fig. 2 and they are represented as a group by the cable 8 in Fig. 1.

Considering further the selector switch 50 in connection with Fig. 2, it should be observed that when selector switch 50 at the left closes its lower contacts 51, corresponding with line switch 10 being closed, that the closing solenoid 11 in the right hand sectionalizer 5 is energized from the control transformer 28 associated with the left hand sectionalizer. Whereas, when the upper contacts 52 of the left selector are closed, corresponding with opening of line switch 10 at the left, solenoid coil 11 in the right hand unit is energized through control transformer 28 associated with the right hand sectionalizer. Under normal load conditions, all of the selector switches are in their lowermost position as demonstrated in Fig. 2. When the system is completely de-energized, all of the selector switches are in their uppermost positions; whereas, during the interval required for re-energizing the system, some of the selector switches may be down while others nearer a faulted section may be in their upper positions. The reason for such action will appear hereinbelow in connection with describing the sectionalizer's mode of operation.

The specification will now proceed with a description of the manner in which the novel sectionalizer units 5 isolate a fault in any line section, restore power to the unfaulted sections of the line, and continue to feed the various branch lines 7 where branch lines are involved. For simplicity, operation of the system will now be described as if it includes only a single source 1, but it will be readily apparent that operation is similar when the system is being fed from multiple sources.

It may be assumed that initially the system is completely de-energized, which means that the line switch 10 in each sectionalizer is in open position and that their voltage latches 14 and current latches 15 are released. Under this condition all of the selector switches 50 will have closed their upper set of contacts 52. If source circuit breaker 3 is now closed, normal voltage will immediately appear on control transformer 28 in the left hand sectionalizer 5 of Fig. 2. This assumes that there is no fault on the first line section 6 nearest source breaker 3. Since the right hand line switch 10 is open, its associated selector switch 50 will be in a position where it closes its upper contacts 52 and completes the circuit through closing solenoid 11 in the left hand sectionalizer 5. This will close the first line switch 10 nearest the source and cause voltage and current latches 14 and 15 to concurrently latch and hold the first line switch 10 in closed position.

Simultaneously with the appearance of normal load voltage on the first control transformer 28 of the first sectionalizer unit 5, voltage responsive plunger 32 is attracted to its uppermost position whereupon it is restrained in latched position by roller 34 as described earlier. Plunger 32 is restrained from any further action until expiration of the time delay period governed by time delay piston 40. If current begins to flow through the first line switch 10 after closure, current latch 15 will set and join in holding the first line switch closed.

As soon as the first line switch 10 on the left in Fig. 2 closes, it also causes the lower contacts 51 of its selector switch 50 to close. This immediately energizes the closing solenoid 11 of the next adjacent sectionalizer 5 to the right by voltage delivered from the left hand control transformer 28 which has normal voltage applied to it. Thus the right hand line switch 10 will also be closed by normal voltage and its associated voltage and current latches 14 and 15 will likewise set and hold.

Closure of right hand line switch 10 will energize its associated control transformer 28 with normal voltage provided no fault appears on the newly connected line section 6. Upon this event, voltage relay 31 will be energized sufficiently to attract its plunger 32 to a time delay position as described in a preceding paragraph. If the remaining line sections and sectionalizers 5 are energized according to the sequence just described, they will all have their voltage relays 30 placed in a time delay condition and after expiration of the time delay period all plungers 32 will be released to their floating position where they take no further action on voltage latches 14. It will be understood that the closing sequence may be initiated at both sources 1 and 2 simultaneously.

There are a number of possible conditions which may exist while the sectionalizers are executing their closing operations. For example, a fault may have existed between the pairs of line switches 10 shown in Fig. 2. In that case closure of the first line switch 10 would have immediately caused back-up circuit breaker 3 to open in response to the flow of fault current. This would result in release of current latch 15 but the line switch 10 would not be permitted to open because its voltage latch 14 would remain engaged as a result of plunger 32 being held in time delayed position. Hence, if the fault did not clear upon subsequent reclosures of the back-up breaker 3, the latter would operate to lockout condition and source 1 would be isolated from the system and from the faulted section 6 under consideration. However, all of the line sections 6 being fed from source 2 toward the fault could be re-energized and the fault in question isolated by opening the right hand sectionalizer switch 10 in Fig. 2 as described heretofore.

If a fault occurs in a line section 6 between a source circuit breaker 3 and the first sectionalizer 5, the breaker will open and reclose in an effort to clear the fault and lockout if the fault is permanent. Meanwhile, a number of possibilities then exist with respect to the sectionalizers 5. If the fault is permanent and there is only one source of supply, the whole system will be de-energized until the fault is repaired. If there are multiple sources, another breaker such as 4 will also open after the fault and all sectionalizers 5 will open. Since the system cannot be energized through circuit breaker 3, sequential closing of the various sectionalizers will be initiated with the one nearest source breaker 4 and continue until the sectionalizer 5 adjacent the fault is reached. Upon this event, sectionalizer 5 adjacent the fault will operate to lockout, thus isolating the fault from another direction. The remainder of the system will then be supplied through source breaker 4.

If the fault between a source breaker and a first adjacent sectionalizer is only temporary, breakers at each source will open but the circuit breaker nearest the fault will remain closed after the first or a subsequent operation. Sequential closing of the sectionalizers 5 will then proceed from both sources in the manner described earlier while considering a fault between sectionalizers.

Now let us carefully examine what happens when a fault occurs on a line section 6 to the right of a pair of sectionalizers 5 depicted in Fig. 2. We assume as before that the left line switch 10 closes and sets both the voltage and current latches 14 and 15 and that the voltage latch 33 goes into time delay condition. Closure of left line switch 10 is followed by closure of the right line switch by reason of normal voltage appearing on control transformer 28 at the left.

As soon as the left selector closes its lower contacts 51, the right closing solenoid will be energized and its associated line switch will close. Upon this event, fault current will flow through all of the sectionalizers between the fault and at least one of the sources. Consequently, the control transformer 28 associated with sectionalizer 5 connected to the faulted section of the line will have subnormal voltage applied to it and, therefore, its voltage relay plunger 32 will be attracted upwardly but will not be latched in a time delay position. At the same time, current latch 15 of the right hand sectionalizer 5 will latch in and prevent opening of the second line switch 10 until the back-up breaker 3 opens in response to the fault. Since normal load voltage has not been applied to the second voltage relay, its plunger 32 will first assume a floating and unlatched position above its voltage latch 14. If the fault current is such that it is accompanied by near zero voltage, plunger 32 will drop down and release latch 14 immediately. At any rate, latch 14 will be released as soon as circuit breaker 3 opens the first time since no voltage will appear anywhere on the system then. Upon cessation of the flow of fault current, current latch 15 will also be released and the lockout mechanism associated only with the sectionalizer unit next preceding the fault will have its counting piston 24 advanced one step toward lockout position.

Circuit breaker 3 automatically recloses following its first opening and all sectionalizers 5 up to the one adjacent the fault remain latched closed so that the line is quickly energized up to the fault. The sectionalizer 5 nearest the fault again has less than normal voltage appear on its voltage relay latch so it is free to open after the breaker opens a second time, its counting mechanism taking another step toward lockout. If the fault persists, that sectionalizer 5 will proceed to lockout. Upon final reclosure of the backup circuit breaker all of the sectionalizers 5 and line sections up to the faulted section will be re-energized and ultimately, all of the plungers 32 will be released to their floating positions following expiration of their time delay in readiness for any other fault which may occur. It is evident that subsequent faults will be cleared in the same manner.

It should also be apparent that this sectionalizing scheme will function just as efficaciously in a system supplied by a single source or where the sectionalizers 5 are located in radial lines being fed from a main line. In addition, sectionalizers 5 will carry out their fault isolating function when dispersed in a totally closed loop system fed from a plurality of sources. The sectionalizers will also operate to isolate a fault on a branch line 7. In this case the sectionalizer units 5 feeding the faulted branch from alternate sources on each side of the branch will execute opening and closing operations described above and isolate the fault by locking open.

In summary, a novel circuit protective scheme and sectionalizer unit therefor has been described which automatically isolates a defective line section from its alternative sources of supply and also isolates faulty branch lines. The sectionalizer unit is adapted to cooperate with similar units in order to minimize outage time subsequent to occurrence of a fault and to restore power to the unfaulted line sections and branch lines with a minimum of time delay. Although for the purposes of illustrating the invention the components comprising the sectionalize have been given a specific form, it is to be understood that the invention is not to be limited for the components may take any number of forms in harmony with the sectionalizing scheme set forth. Hence the disclosure is illustrative rather than limiting, for the invention may be variously embodied and is to be construed by interpretation of the claims which follow.

It is claimed:

1. In an electric power circuit comprising a plurality of sections, a power source connected to one of said sections, a reclosing circuit breaker near said source, and sectionalizing means connecting said sections in series, voltage responsive means associated with each of said sectionalizing means for opening said sectionalizing means after the opening of said reclosing circuit breaker, means for sequentially reclosing said sectionalizing means after said circuit breaker recloses, and time delayed latching means for preventing subsequent opening of said sectionalizing means if the section connected by said sectionalizing means is not faulted.

2. In an electric power circuit comprising a plurality of sections, a power source connected to one of said sections, a reclosing circuit breaker near said source, and sectionalizing means connecting said sections in series, switch means included in said sectionalizing means, opening means for said switch means, voltage responsive means including latch means for rendering said opening means ineffective if the section connected by said switch means is not faulted and for rendering said opening means effective if the section connected by the switch means is faulted, current responsive latch means for rendering said opening means ineffective when current is flowing in the circuit, means for reclosing said switch means including selector switch means associated with an adjacent sectionalizing switch means, and lockout means including counting means for rendering said lockout means effective.

3. The invention according to claim 2 including a time delay means associated with said current responsive latch means for temporarily preventing release of said current responsive latch means.

4. In an electric power circuit comprising a plurality of sections, a power source connected to one of said sections, a reclosing circuit breaker near said source, and sectionalizing means connecting said sections in series, said sectionalizing means including switch means, voltage responsive means effective to permit opening of said switch means after opening of said circuit breaker, electromagnetic means for reclosing said switch means after said circuit breaker recloses, and time delayed latching means associated with said voltage responsive means effective to prevent subsequent opening of said switch means if the section connected by said switch means is not faulted and ineffective to prevent subsequent opening of said switch means if the section connected by said switch means is faulted.

5. In an electric power circuit comprising a plurality of sections, a power source connected to one of said sections, a reclosing circuit breaker near said source, and sectionalizing means connecting said sections in series, said sectionalizing means including switch means, means for opening said switch means, voltage responsive means including latch means for rendering said opening means ineffective if the section connected by said switch means is not faulted and for rendering said opening means effective if the section connected by said switch means is faulted, electromagnetic means for reclosing said switch means, and lockout means including counting means for rendering said lockout means effective.

6. In an electric power circuit comprising a plurality of sections, a power source connected to one of said sections, a reclosing circuit breaker near said source, and sectionalizing means connecting said sections in series, said sectionalizing means including switch means, voltage responsive latch means for rendering said switch opening means effective when the voltage on the system falls to substantially zero, time delay latch means temporarily rendering said voltage responsive latch means ineffective if the section connected by said switch means is not faulted and for rendering said voltage responsive latch means effective if the section connected by said switch means is faulted, current responsive latch means for rendering said opening means ineffective when current is flowing in the circuit and time delay means associated with said current responsive means for temporarily preventing release of said current responsive latch, means for reclosing said switch means including selector switch means associated with an adjacent sectionalizing switch means, and lockout means including counting means for rendering said reclosing means ineffective.

7. In an electric power system comprising a plurality of sections, a power source connected to one of said sections, a reclosing circuit breaker near said source, and sectionalizing means connecting said sections in series, said sectionalizing means including switch means, means for opening said switch means, voltage responsive means including latch means for rendering said opening means ineffective if the section connected by the switch means is not faulted and for rendering said opening means effective if the section connected by said switch means is faulted, current responsive latch means for rendering said opening means ineffective when current is flowing in the circuit, means for reclosing said switch means, and lockout means including counting means for rendering said lockout means effective.

8. In an electric power circuit comprising a plurality of sections, multiple power sources supplying the circuit, a reclosing circuit breaker at each of said sources and sectionalizing means connecting said sections in series, voltage responsive means associated with each of said sectionalizing means, means for opening said sectionalizing means after the opening of said reclosing circuit breaker, said opening means being rendered effective by said voltage responsive means, means for sequentially reclosing said sectionalizing means after said circuit breaker recloses, and time delayed latching means preventing subsequent opening of said sectionalizing means if the section connected by said sectionalizing means is not faulted.

9. In an electric power circuit comprising a plurality of sections, multiple power sources supplying the circuit, a reclosing circuit breaker at each of said sources and sectionalizing means connecting said sections in series, switch means included in said sectionalizing means, means for opening said switch means, voltage responsive means including latch means for rendering said opening means ineffective if the section connected by said switch means is not faulted and for rendering said opening means effective if the section connected by said switch is faulted, current responsive latch means for rendering said opening means ineffective when current is flowing in the circuit, means for reclosing said switch means including selector switch means associated with an adjacent sectionalizing switch means, and lockout means including counting means for rendering said lockout means effective.

10. In an electric power circuit comprising a plurality of sections, multiple power sources supplying the circuit, a reclosing circuit breaker at each of said sources and sectionalizing means connecting said sections in series, switch means included in said sectionalizing means, means for opening said switch means, voltage responsive means including latch means for rendering said opening means ineffective if the section connected by said switch means is not faulted and for rendering said opening means effective if the section connected by said switch means is faulted, current responsive latch means for rendering said opening means ineffective when current is flowing in the circuit and time delay means associated with said current responsive latch means for temporarily preventing the release of said current responsive latch, means for reclosing said switch means including selector switch means associated with an adjacent sectionalizing switch means, and lockout means including counting means for rendering said reclosing means ineffective.

11. In an electric power circuit comprising a plurality of sections, multiple power sources supplying the circuit, a circuit breaker at each of the sources and sectionalizing means connecting said sections in series, said sectionalizing means including switch means, means for opening said switch means following opening of said circuit breakers, voltage responsive means including latch means for rendering said opening means ineffective if the section connected by said switch means is not faulted, electromagnetic means for reclosing said switch means, and lockout means including counting means for rendering said lockout means effective.

12. In an electric power circuit comprising a plurality of sections, multiple power sources supplying the circuit, a reclosing circuit breaker at each of said sources and sectionalizing means connecting said sections in series, said sectionalizing means including switch means, means for opening said switch means, voltage responsive latch means for rendering said switch opening means effective when the voltage on the system falls to zero due to opening of said circuit breakers, time delay latch means for temporarily rendering said voltage responsive latch means ineffective if the section connected by said switch means is not faulted and for rendering said voltage responsive means effective if the section connected thereby is faulted, current responsive latch means for rendering said opening means ineffective when current is flowing in the circuit and time delay means associated with said current responsive latch means for temporarily preventing the release of said current responsive latch, means for reclosing said switch means including selector switch means associated with an adjacent sectionalizing switch means, and lockout means including counting means for rendering said reclosing means ineffective.

13. In an electric power circuit comprising a plurality of sections, multiple power sources supplying the circuit, a reclosing circuit breaker at each of said sources and sectionalizing means connecting said sections in series, said sectionalizing means including switch means, means for opening said switch means, voltage responsive means including latch means for rendering said opening means ineffective if the section connected by said switch means is not faulted and for rendering said opening means effective if the section connected by said switch means is faulted, current responsive latch means for rendering said opening means ineffective when current is flowing in the circuit, means for reclosing said switch means, and lockout means including counting means for rendering said lockout means effective.

14. In an electric power circuit comprising a plurality of sections, multiple power sources supplying the circuit, a reclosing circuit breaker at each of said sources and sectionalizing means connecting said sections in series, a branch line connected between a pair of said sectionalizers, said sectionalizers including line switch means and sequential closing means therefor, latch means normally holding said switch means closed, switch opening means, voltage responsive means adapted to render said latch means ineffective to hold said switch means closed after said circuit breakers open in response to a fault and adapted to render said latch means effective to hold said switch means closed if normal voltage appears on a line section from which the voltage responsive means is energized, selector switch means associated with each sectionalizing means, the selector switch means associated with a sectionalizing means on one side of said branch line controlling the line switch means of a sectionalizing means on the other side of the branch line, whereby one of said line switch means may open to disconnect one of the sources from the branch line while the other continues to supply said branch line.

References Cited in the file of this patent

UNITED STATES PATENTS

| | | |
|---|---|---|
| 2,468,498 | Kyle | Apr. 26, 1949 |
| 2,475,765 | Wallace | July 12, 1949 |
| 2,654,053 | Wallace | Sept. 29, 1953 |
| 2,832,010 | Chabala | Apr. 22, 1958 |